(12) United States Patent
Pleines et al.

(10) Patent No.: US 7,038,912 B2
(45) Date of Patent: May 2, 2006

(54) HIGH-POWER SWITCHGEAR WITH COOLING RIB ARRANGEMENT

(75) Inventors: Marianne Pleines, Winterthur (CH); Jean-Claude Mauroux, Hunzenschwil (CH); Martin Lakner, Birmenstorf (CH); Thomas Schoenemann, Schafisheim (CH)

(73) Assignee: ABB Research LTD, Zurich (CH)

( * ) Notice: Subject to any disclaimer, the term of this patent is extended or adjusted under 35 U.S.C. 154(b) by 95 days.

(21) Appl. No.: 10/880,456

(22) Filed: Jul. 1, 2004

(65) Prior Publication Data
US 2005/0007742 A1   Jan. 13, 2005

(30) Foreign Application Priority Data
Jul. 11, 2003   (EP) .................................. 03405527

(51) Int. Cl.
*H05K 7/20*   (2006.01)
(52) U.S. Cl. .................... 361/704; 361/676; 174/16.2; 218/155
(58) Field of Classification Search ................ 361/604, 361/612, 619, 673, 676, 704; 174/16.2, 18
See application file for complete search history.

(56) References Cited

U.S. PATENT DOCUMENTS

| 3,761,599 | A | 9/1973 | Beatty | |
| 6,236,562 | B1* | 5/2001 | Wilfert et al. | 361/676 |
| 6,510,047 | B1* | 1/2003 | Meiners et al. | 361/676 |
| 6,794,595 | B1* | 9/2004 | Charles et al. | 218/149 |
| 6,897,396 | B1* | 5/2005 | Ito et al. | 218/120 |
| 2003/0168432 | A1* | 9/2003 | Onizuka et al. | 218/7 |

FOREIGN PATENT DOCUMENTS

| DE | 2707205 | 8/1978 |
| JP | 04109524 | 4/1992 |

\* cited by examiner

*Primary Examiner*—Boris Chérvinsky
(74) *Attorney, Agent, or Firm*—Buchanan Ingersoll PC

(57) ABSTRACT

The high-power switch (1) according to the invention, with at least one switch pole (2) for guiding and switching an electric current which flows in one current flow direction when the switch is in the closed state, with the at least one switch pole (2) containing an inner conductor (3) which carries the current and containing an outer conductor (4) which is connected to ground potential (G) and carries a return current in the opposite direction to the current, with the outer conductor (4) being in the form of a housing (4) which surrounds the inner conductor (3), is characterized in that a cooling rib arrangement (5) which contains cooling ribs (9) is arranged on the outer conductor (4). At least some of the cooling ribs are advantageously arranged on a separate part of the housing (4), which is not the same as the part (15) of the housing (4) which is at a minimum distance from the inner conductor (3). The cooling rib arrangement (5) advantageously has cooling ribs both outside the housing (4) and inside the housing (4).

11 Claims, 2 Drawing Sheets

HIGH-POWER SWITCHGEAR WITH COOLING RIB ARRANGEMENT

TECHNICAL FIELD

The invention relates to the field of high-power switch technologies, and in particular to a high-power switch as claimed in the precharacterizing clause of Patent claim 1.

PRIOR ART

High-power switches such as these (heavy current and/or high-voltage switches) such as self-blowout switches, gas-insulated switchgear assemblies, in particular generator switches, have been known for several decades and generally have in each case one switch pole, which is encapsulated, for each of three electrical phases. An inner conductor, which carries the current to be interrupted is located inside a switch pole such as this. The corresponding rated currents are typically between 6 kA and 40 kA at voltages of 1 kV to 50 kV. The inner conductor is surrounded by an outer conductor, which forms the encapsulation for the inner conductor, so that there is an area essentially without any field outside the outer conductor. The outer conductor, which is in the form of a housing, is connected to ground potential and carries a return current, which is in the opposite direction to the current in the inner conductor, and is in the same order of magnitude as the current in the inner conductor. In a high-power switch with a number of switch poles, the outer conductors of the switch poles are electrically connected to one another.

At the current levels mentioned, resistive losses lead to severe heating of the generally tubular inner conductor. During operation at the rated current, a maximum temperature, which is specified by Standards, for example of 105° C., and thus a maximum temperature rise resulting from this, for example, 65° C., must not be exceeded in the switch, as a result of which the maximum rated current of the switching device is limited. For this reason, inner conductors such as these are often provided with heat sinks, thus increasing the proportion of the heat which can be dissipated by convection. The outer conductor is less problematic than the inner conductor as a heat source. The resistive heating of the outer conductor is admittedly comparable to that of the inner conductor, but the outer conductor has a surface area which is many times larger than that of the inner conductor, so that a large amount of heat can be dissipated by the thermal radiation and by convection. While the inner conductor may typically be at temperatures of 100° C. to 105° C., the outer conductor temperatures are typically 65° C. to 70° C. Furthermore, unlike the inner conductor, the outer conductor is not surrounded by a further housing, so that the thermal energy of the outer conductor can be emitted very efficiently via thermal radiation to the environment and by exchange with the outside air (convection). The temperature and the temperature rise in the outer conductor are thus considerably less than those in the inner conductor.

A switching device such as this has the disadvantage that, in order to achieve a high maximum permissible rated current for the switching device, a complex cooling arrangement must be fitted to the inner conductor in order to ensure that the specified maximum temperature is not exceeded.

DESCRIPTION OF THE INVENTION

The object of the invention is therefore to provide a high-power switch of the type mentioned initially, but which does not have the disadvantages mentioned above. One particular aim is to provide a switching device for high-rated currents and power levels, which do not exceed a specified maximum temperature when the rated current is flowing, and which is nevertheless compact and requires only a moderately complex cooling arrangement of the inner conductor.

This object is achieved by an apparatus and a method having the features of patent claim 1.

The high-power switch according to the invention with at least one switch pole for carrying and switching an electric current which flows in one current flow direction when the switch is in the closed state, with at least one switch pole containing an inner conductor which carries the current and containing an outer conductor which is connected to ground potential and carries a return current in the opposite direction to the current, with the outer conductor being in the form of a housing which surrounds the inner conductor, is characterized in that a cooling rib arrangement which contains cooling ribs is arranged on the outer conductor.

According to the invention, instead of arranging cooling ribs just on the hot inner conductor, cooling ribs are also arranged on the outer conductor which, per se, is considerably less hot than the inner conductor. This improves the effectiveness of the inner conductor cooling, without needing to modify the inner cooling itself. This is because the air within the outer conductor (housing) can emit its heat (which has been absorbed from the inner conductor) more effectively to the housing, since the housing can in turn emit its heat more effectively to the environmental air surrounding the housing, by means of the cooling rib arrangement. This allows very high rated currents to be carried in compliance with the Standards, even without using particularly complex, for example, active, inner conductor cooling. The switch pole encapsulation (housing) and thus the switch, may in this case remain compact. There is no need to enlarge the interior of the switch, which would also lead to more effective heat dissipation from the inner conductor. This makes it possible to produce a compact switch with small external dimensions.

One particularly advantageous embodiment of the subject matter of the invention is characterized in that the cooling rib arrangement is at least partially arranged on such a part of the housing which is different from that part of the housing which is at a minimum distance from the inner conductor. This results in the cooling ribs producing a good cooling effect.

The housing part or the housing parts which is or are at a minimum distance or a particularly short distance from the inner conductor carries or carry the greatest proportion of the return current, where the resistive losses and the heating of the housing as well, are at a maximum. Those parts of the housing which are further away carry little, or even negligibly little, return current and are thus heated to a considerably lesser extent. Furthermore, those parts of the housing which are arranged closer to the inner conductor are also heated to a greater extent by the air (which is heated by the inner conductor) in the interior of the housing. However, simulated calculations have shown that the introduction of cooling ribs into a part of the housing through which a large proportion of the return current flows leads to an increase in the losses owing to the non-uniform current distribution in the outer conductor, which leads to heating of the outer conductor.

The housing therefore has at least one housing part which is further away from the inner conductor than another part of the housing, with the cooling rib arrangement being arranged partially, or advantageously entirely, on the housing part such as this. This results in more effective cooling, and thus in a higher maximum permissible rated current. One advantageous feature is that no cooling ribs are arranged on parts of the housing which are at a minimal distance from the inner conductor.

In one preferred embodiment, the housing has a base part, two side parts and a cover, with at least a part of the cover being further away from the inner conductor than the base part and the side parts, and with the cooling rib arrangement being arranged on those parts of the cover. The cover is arranged at the top on the switch pole (with respect to the earth's field of gravity). The arrangement of cooling ribs on the cover also results in an improvement in the cooling performance of the cooling rib arrangement, because the heated air rises upwards within the housing.

One major advantage is that the cooling rib arrangement has cooling ribs both outside the housing and inside the housing. This leads to a considerable improvement in the cooling effect of the cooling rib arrangement. Since the cooling rib arrangement results in the inner conductor being cooled indirectly via the air in the interior of the housing, a good, large-area thermal contact between the cooling rib arrangement and the air in the interior of the housing is highly advantageous. This is produced by the cooling ribs in the interior of the housing. A good thermal contact with the outside air is produced by the outer cooling ribs.

A particularly efficient cooling effect is achieved if the cooling rib arrangement has a base plate which is connected to the housing, has inner cooling ribs on a side which faces the interior of the housing, and has outer cooling ribs on a side which faces away from the interior of the housing. It is particularly advantageous for the cooling ribs to extend at right angles to the base plate. The edges of the base plate are advantageously connected to the housing and make direct thermal contact with it.

It is also particularly advantageous for the inner cooling ribs to be aligned parallel to the outer cooling ribs and, in addition, for the inner cooling ribs to be arranged offset with respect to the outer cooling ribs. This makes it easier to manufacture them, particularly, when the cooling ribs are manufactured by extrusion. However, the inner and outer cooling ribs may also be arranged such that they are not offset with respect to one another, that is to say for example, in each case being arranged in pairs on a plane.

A further advantage is achieved if the inner cooling ribs extend to a lesser extent into the interior of the housing than the outer cooling ribs extend away from the housing. This results in a good cooling effect while at the same time satisfying dielectric requirements, in that reduced field strengths are achieved in the housing, because the cooling ribs may be a long distance away from the inner conductor.

The cooling ribs are preferably flat and are aligned at right angles to the current flow direction. This on the one hand results in a large area for convection per base area that is occupied by the cooling rib arrangement, while on the other hand minimizing electrical losses, resulting from eddy currents, and thus the heating associated with them.

In one preferred embodiment of the subject matter of the invention, the cooling rib arrangement has two or more cooling rib modules, which are arranged at a distance from one another on the housing and are individually connected to the housing. This makes it easier to manufacture the cooling rib arrangement, while allowing the cooling rib modules to be arranged in a variable manner on the outer conductor, thus allowing a flexible and global design of the cooling rib arrangement as well as flexible matching of the cooling rib arrangement to different switch types by means of identical parts. It is particularly advantageous for the cooling rib modules to be welded into the housing. This results in a good thermal contact between the cooling rib modules and the housing, and the manufacturing processes are simple. Furthermore, the weight of the outer conductor is kept low, if parts of the housing are replaced by welded-in cooling rib modules.

The cooling rib arrangement advantageously has two or more identical integral cooling rib elements, which are advantageously arranged parallel alongside one another and are connected to one another. This also results in a flexible matching capability to different cooling rib arrangement designs and switch types, and to an improvement in the manufacturing capability, particularly when the cooling rib elements are manufactured by extrusion. The cooling rib arrangement particularly advantageously has two or more cooling rib modules which each comprise two or more cooling rib elements such as these, are arranged at a distance from one another on the housing, and are individually connected to the housing. This combines the advantages of the cooling rib modules with those of the cooling rib elements, and results in an optimally modularized cooling rib arrangement design which can be manufactured easily and is flexibly adaptable.

If, in addition, the cooling rib elements also have cooling ribs which are parallel to one another and are separated by the same distance D, and adjacent cooling ribs such as these on two adjacent cooling rib elements are at a distance from one another which is greater than the distance D, this is a further advantage. This is because the combination or connection, for example by welding, of two adjacent cooling rib elements is simplified, because the accessibility to the junction point (weld bead) is improved, thus considerably improving the manufacturing capability.

If the cooling rib elements have cooling ribs both outside the housing and inside the housing, only those inner cooling ribs which are arranged inside the housing or only those outer cooling ribs which are arranged outside the housing of two adjacent cooling rib elements are advantageously at a distance from one another which is greater than the distance D. This results in a very good cooling effect and improved manufacturing capability.

In one particularly preferred embodiment of the subject matter of the invention, the high-power switch has at least two switch poles which are arranged alongside one another and whose current flow directions run parallel to one another, with the outer conductors of the switch poles being conductively connected to one another, with at least one of the switch poles having a cover which is arranged above the inner conductor and has an incline facing the adjacent switch pole, and with cooling ribs of the cooling rib arrangement being arranged on the incline. This results in very effective cooling by means of the cooling rib arrangement. Air which has not yet been heated or has been heated only slightly rises between the adjacent switch poles, in this way passing the cooling ribs which are arranged on the incline, thus ensuring a considerably better cooling effect by convection. Thermal radiation can nevertheless be emitted efficiently. This therefore results in improved cooling by means of the air flow that is created between adjacent switch poles, while cooling by radiated heat emission also still takes place efficiently. In the case of cooling ribs that are fitted to mutually parallel parts of adjacent switch poles 2, the thermal radiation of heat would be greatly restricted, for example, if the cooling ribs were fitted to the side parts 7.

The cooling is particularly effective if in each case two adjacent switch poles each have a cover, which is arranged above the respective inner conductor, with an incline which faces the respectively adjacent switch pole and is provided with cooling ribs of the cooling rib arrangement. In this advantageously symmetrical design, both switch poles profit from the active cooing resulting from the air flow between the switch poles.

Further preferred embodiments and advantages will become evident from the dependent patent claims and from the figures.

BRIEF DESCRIPTION OF THE DRAWINGS

The subject matter of the invention will be explained in more detail in the following text with reference to preferred exemplary embodiments, which are illustrated in the attached drawings, in which, schematically.

Figure 1:
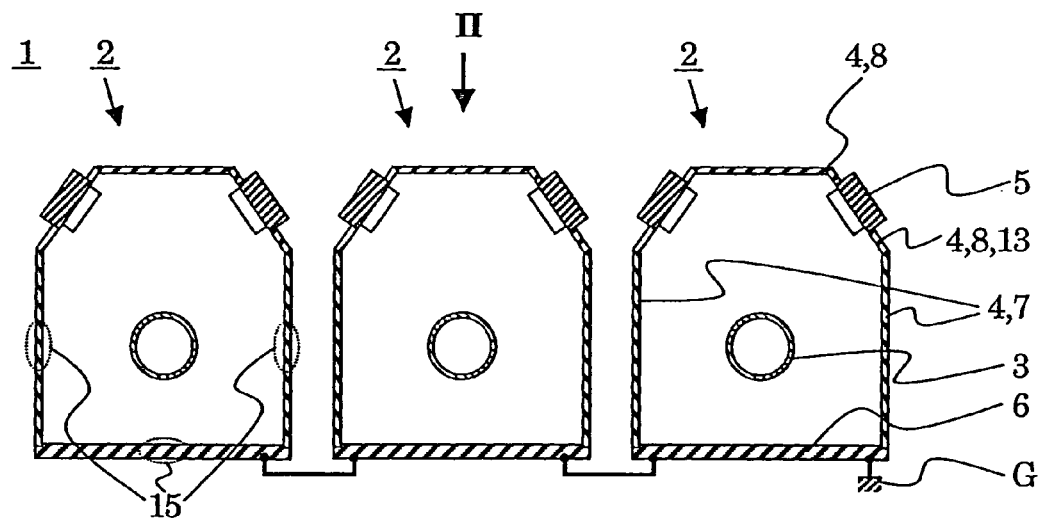
FIG. 1 shows a plan view of a vertical section through a high-power switch according to the invention with three switch poles having covers with inclines with inner and outer cooling ribs.

The reference symbols used in the drawings and their meaning are listed in summarized form in the list of reference symbols. In principle, identical parts or parts having the same effect in the figures are provided with the same reference symbols. The described exemplary embodiments represent examples of the subject matter of the invention and have no restrictive effect.

APPROACHES TO IMPLEMENTATION OF THE INVENTION

Figure 3:
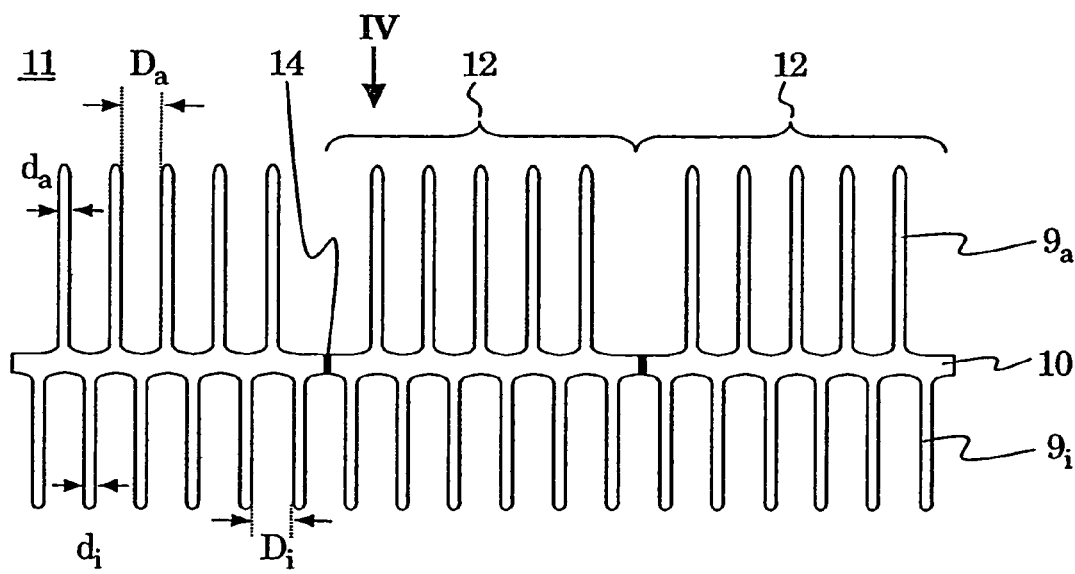
FIG. 3 shows a section through a cooling rib module formed from three cooling rib elements.
Figure 4:
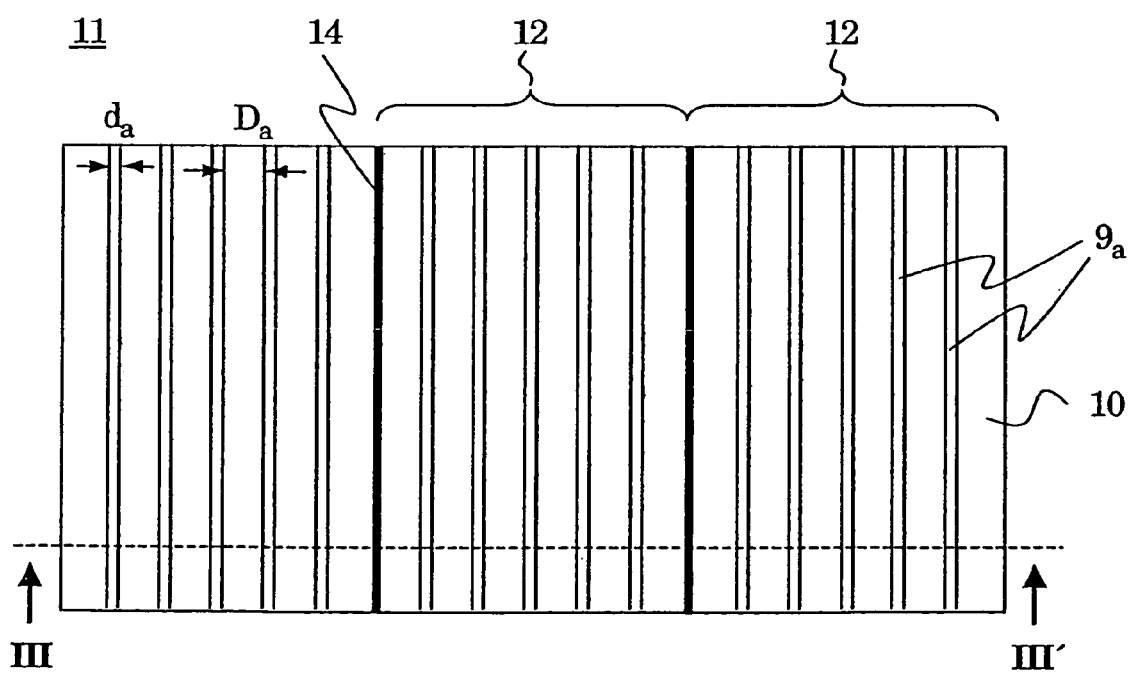
FIG. 4 shows a plan view of the cooling rib module as shown in FIG. 3.

FIG. 1 shows, schematically, a plan view and a vertical section through a high-power switch 1 according to the invention. The high-power switch 1, which is in the form of a generator switch 1 for currents from about 7.5 kA to 18 kA, in particular ≧9.5 kA, has three identical switch poles 2. The switch poles 2 each have a tubular inner conductor 3 and an outer conductor 4, which surrounds the inner conductor 3 as a housing 4. The inner conductor 3 is often also referred to as the active part 3, and the outer conductor 4 is referred to as the passive part 4 or encapsulation 4. The high-power switch 1 also, of course, includes drives, a switching gap and further components which a person skilled in the art of high-voltage and power-current switch technology would expect in a high-power switch 1, although these are not illustrated in FIG. 1. The housing 4 includes a base part 6, two side parts 7 and a cover 8 (and in each case one front part and rear part, which are not illustrated or annotated). The base part and the side parts 7 (and the front part and rear part) may be formed integrally. The cover 8 has two inclines 13 and is advantageously screwed to the side parts 7 (and to the front part and rear part) of the housing. A cooling rib arrangement 5 is arranged on these inclines 13. The cooling rib arrangement 5 has inner cooling ribs, which extend into the interior of the housing 4, and outer cooling ribs, which are arranged outside the housing 4, with the cooling ribs being aligned at right angles to the longitudinal axis of the inner conductor 3, and with the inner cooling ribs being offset with respect to the outer cooling ribs. FIGS. 3 and 4 show the cooling rib arrangement in greater detail.

As can be seen from the bottom of FIG. 1, the outer conductors 4 are electrically conductively connected to one another and to ground potential G. When the switch poles 2 are closed, the inner conductors 3 carry the current of one electrical phase. The outer conductors then carry a return current, which is in the opposite direction to the current in the inner conductor and is of the same order of magnitude. The inner conductor is advantageously provided with a cooling apparatus, for example with cooling ribs, although this is not illustrated in FIG. 1.

Resistive losses result in the inner conductor being heated severely when current flows. As has been described above, the cooling rib arrangement 5 indirectly improves the cooling of the inner conductor 3 which, per se, is considerably hotter than the outer conductor 4. The cooling rib arrangement 5 is not arranged on those regions 15 in which the current density in the outer conductor 4 is at a maximum. These regions 15 are located where the distance between the inner conductor 3 and the outer conductor 4 is a minimum. These regions 15 are surrounded by dotted outlines in FIG. 1. The cooling ribs of the cooling rib arrangement 5 are advantageously fitted to parts of the outer conductor 4 where the current density of the return current is at least one order of magnitude less than the maximum current density in the outer conductor 4, advantageously on parts where the return current is negligible. This results in the resistance of the outer conductor 4 not being increased, or being increased only to a negligible extent.

Figure 2:
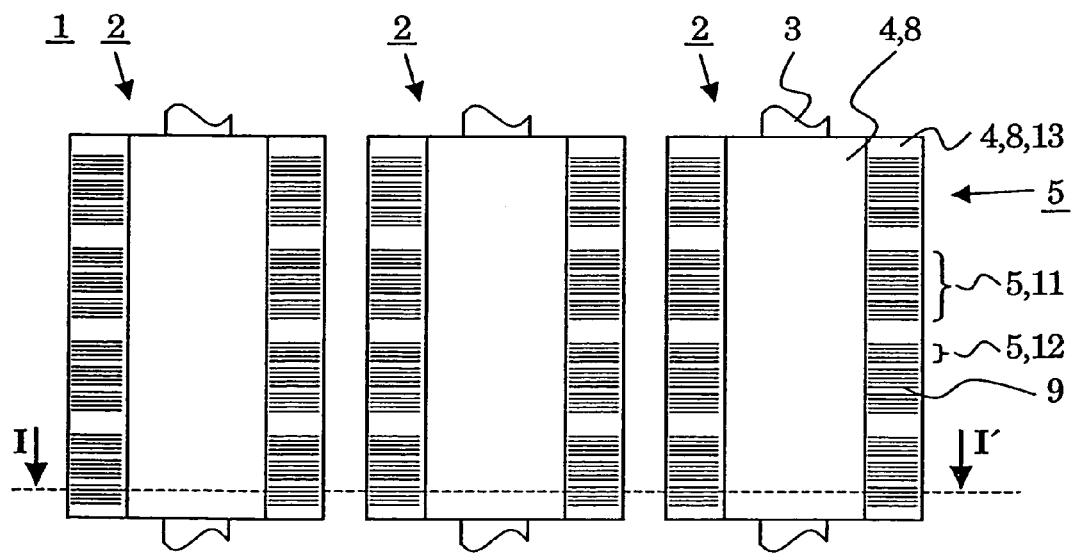
FIG. 2 shows a plan view of the high-power switch shown in FIG. 1.

FIG. 2 shows, schematically, a plan view of the high-power switch 1 as shown in FIG. 1, in the direction annotated II in FIG. 1. In FIG. 2, I,I' denote the section and the plan view which are illustrated in FIG. 1.

The plan view of the cover 8 of the switch poles 2 in FIG. 2 shows the cooling rib arrangement 5 in more detail. The cooling rib arrangement 5 has a number of cooling rib modules 11, to be more precise four, which should ideally be identical, per incline 13 on the cover 8. These are at a distance from one another and are fitted to the cover individually. The cooling rib modules 11 are advantageously welded into the cover 8. This means that one part of the cover 8 is in each case removed and replaced by one cooling rib module 11.

As illustrated, the cooling rib modules 11 themselves are advantageously formed from a number of cooling rib modules 12, to be more precise three, which are advantageously identical and are connected to one another, in particular being welded together. Each cooling rib element 12 has a number of cooling ribs 9. The outer cooling ribs 9 can be seen in FIG. 2. The cooling rib elements 12 and the cooling ribs 9 are illustrated in more detail in FIGS. 3 and 4.

FIG. 3 shows, schematically, a section through a cooling rib module 11 formed from a number of identical cooling rib elements 12, to be more precise three, which are welded together at weld beads 14. Each cooling rib element 12 is formed from a base plate 10 as well as inner cooling ribs $9_i$ and outer cooling ribs $9_a$. A cooling rib module 11 such as this may be welded at its edges to a cover of an outer conductor. Other possible ways to connect the cooling rib module 11 to the outer conductor are, for example, soldering, clinching or adhesive bonding.

The inner and outer cooling ribs $9_i$, $9_a$, respectively, have thicknesses $d_i$ and $d_a$, respectively, which in this example are chosen to be of the same magnitude. Adjacent cooling ribs $9_i$, $9_a$ are separated from one another by distances $D_i$ and $D_a$ respectively. The distances in this example are chosen to be of the same magnitude. The distances $D_i$, $D_a$ are typically between 9 mm and 16 mm (the distances measured between centers are correspondingly greater). The thicknesses $d_i$, $d_a$ are typically between 1 mm and 5 mm.

The base plate is advantageously of the same thickness as the cooling ribs 9, since this minimizes distortion of the cooling rib elements 12 when cooling down after forming of the cooling rib elements 12. The manufacturing capability is improved even further if the inner cooling ribs $9_i$ and the outer cooling ribs $9_a$ are arranged offset with respect to one another, particularly when the individual cooling rib elements 12 are manufactured by extrusion. Other methods for manufacturing the cooling rib elements 12 are, for example, laser welding, casting (in particular sand casting) and soldering. The cooling rib elements 12 are advantageously (weight and thermal conductivity) manufactured substantially from aluminum.

In order to make it easier to manufacture the cooling rib modules 11 from the cooling rib elements 12, the adjacent cooling ribs 9 of two adjacent cooling rib elements 12 are further apart than the distance D. This makes the junction point (weld bead) more accessible.

In order to avoid electrical field peaks in the interior of the outer conductor, the inner cooling ribs $9_i$ are on the one hand shorter than the outer cooling ribs $9_a$. Secondly, the inner cooling ribs $9_i$ are rounded at their end facing away from the base plate 10. This results not only in a good cooling effect, but is also a good way to avoid high field strengths (field peaks) within the housing.

FIG. 4 shows, schematically, a plan view of the cooling rib module 11 as shown in FIG. 3 along the direction which is annotated IV in FIG. 3, so that only the outer cooling ribs $9_a$ and the base plate 10 can be seen. The section illustrated in FIG. 3 is annotated III, III' in FIG. 4.

In one advantageous embodiment, which is not illustrated but has inner cooling ribs, a metal plate which is conductively connected to the cooling ribs is arranged between these cooling ribs and the inner conductor. A metal plate such as this provides very good shielding for those ends of the cooling ribs which face the inner conductor, so that the cooling rib arrangement cannot produce high field strengths in the interior of the housing. The metal plate is preferably fitted with at least one, and advantageously two or more cooling ribs at the end of the cooling rib or cooling ribs facing the inner conductor. The metal plate is particularly preferably connected to that end of all the cooling ribs of a cooling rib element which face the inner conductor, and/or to all of the cooling ribs in a cooling rib module. The metal plate may advantageously be aligned parallel to a base plate of the cooling rib arrangement (and/or to the base plate of a cooling rib module and/or the base plate of a cooling rib element).

| List of reference symbols | |
|---|---|
| 1 | High-power switch |
| 2 | Switch pole |
| 3 | Inner conductor, active part |
| 4 | Outer conductor, housing, encapsulation, passive part |
| 5 | Cooling rib arrangement |
| 6 | Base part |
| 7 | Side part |
| 8 | Cover |
| 9, $9_i$, $9_a$ | Cooling ribs |
| 10 | Base plate |
| 11 | Cooling rib module |

-continued

| List of reference symbols | |
|---|---|
| 12 | Cooling rib element |
| 13 | Incline |
| 14 | Weld bead |
| 15 | Region of maximum current density in the outer conductor |
| a | Index for "inner" (inside the housing) |
| i | Index for "outer" (outside the housing) |
| d | Thickness of a cooling rib |
| D | Distance between adjacent cooling ribs |
| G | Ground potential |

The invention claimed is:

1. A high-power switch with at least one switch pole for guiding and switching an electric current which flows in one current flow direction when the switch is in the closed state, with the at least one switch pole comprising an inner conductor, which carries the current and comprising an outer conductor, which is connected to ground potential and carries a return current, which flows in the opposite direction to the current, with the outer conductor being in the form of a housing, which surrounds the inner conductor, wherein on the outer conductor a cooling rib arrangement is arranged, which contains cooling ribs.

2. The high-power switch as claimed in claim 1, wherein the cooling rib arrangement is at least partially arranged on such a part of the housing, which is different from that part of the housing, which is at a minimum distance from the inner conductor, in particular wherein the housing has a base part, two side parts and a cover, with at least a part of the cover being further away from the inner conductor than the base part and the side parts, and with the cooling rib arrangement being arranged on those parts of the cover.

3. The high-power switch as claimed in claim 1, wherein the cooling rib arrangement has cooling ribs both outside the housing and inside the housing.

4. The high-power switch as claimed in claim 3, wherein the cooling rib arrangement has a base plate, which is connected to the housing, has inner cooling ribs on a side, which faces the interior of the housing, and has outer cooling ribs on a side, which faces away from the interior of the housing, in particular with the cooling ribs extending at right angles to the base plate, and in particular with the base plate being connected at its edges to the housing.

5. The high-power switch as claimed in claim 3, wherein the inner cooling ribs are aligned parallel to the outer cooling ribs, and wherein the inner cooling ribs are arranged offset with respect to the outer cooling ribs.

6. The high-power switch as claimed in claim 3, wherein the inner cooling ribs extend to a lesser extent into the interior of the housing than the outer cooling ribs extend away from the housing.

7. The high-power switch as claimed in claim 1, wherein the cooling ribs are flat and are aligned at right angles to the current flow direction.

8. The high-power switch as claimed in claim 1, wherein the cooling rib arrangement has two or more cooling rib modules, which are arranged at a distance from one another on the housing and are individually connected to the housing, in particular being welded into the housing.

9. The high-power switch as claimed in claim 1, wherein the cooling rib arrangement has two or more identical integral cooling rib elements, which are arranged parallel alongside one another and are connected to one another, in particular with the cooling rib arrangement being formed from two or more cooling rib modules which each comprise two or more cooling rib elements, which cooling rib modules are arranged at a distance from one another on the housing and are individually connected to the housing.

10. The high-power switch as claimed in claim 9, wherein the cooling rib elements have cooling ribs which are parallel to one another and are separated by an equal distance D, and wherein adjacent cooling ribs of adjacent cooling rib elements are at a distance from one another which is greater than the distance D, in particular wherein the cooling rib elements have cooling ribs both outside the housing and inside the housing, and wherein the inner cooling ribs, which are arranged inside the housing and/or the outer cooling ribs, which are arranged outside the housing, of two adjacent cooling rib elements are at a distance from one another, which is greater than the distance D.

11. The high-power switch as claimed in claim 1, wherein the high-power switch has at least two switch poles, which are arranged alongside one another and whose current flow directions run parallel to one another, with the outer conductors of the switch poles being conductively connected to one another, with at least one of the switch poles having a cover, which is arranged above the inner conductor and has an incline facing the adjacent switch pole, and with cooling ribs of the cooling rib arrangement being arranged on the incline, in particular with in each case two adjacent switch poles, each having a cover which is arranged above the respective inner conductor with an incline which faces the respectively adjacent switch pole and is provided with cooling ribs in the cooling rib arrangement.

* * * * *